United States Patent
Tsai

(10) Patent No.: US 11,191,063 B2
(45) Date of Patent: Nov. 30, 2021

(54) MULTIPLE PHYSICAL UPLINK CONTROL CHANNEL (PUCCH) RESOURCES FOR AN UPLINK CONTROL INFORMATION (UCI) REPORT

(71) Applicant: MEDIATEK INC., Hsinchu (TW)

(72) Inventor: Cheng-Rung Tsai, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 80 days.

(21) Appl. No.: 16/715,489

(22) Filed: Dec. 16, 2019

(65) Prior Publication Data

US 2020/0221445 A1  Jul. 9, 2020

Related U.S. Application Data

(60) Provisional application No. 62/790,155, filed on Jan. 9, 2019.

(51) Int. Cl.
*H04W 72/04*  (2009.01)
*H04L 1/00*  (2006.01)
*H04L 5/00*  (2006.01)

(52) U.S. Cl.
CPC ....... *H04W 72/0413* (2013.01); *H04L 1/0026* (2013.01); *H04L 5/0092* (2013.01); *H04W 72/0453* (2013.01)

(58) Field of Classification Search
CPC .......... H04W 72/0453; H04W 72/0413; H04L 5/0092; H04L 5/0053; H04L 1/0026
See application file for complete search history.

(56) References Cited

U.S. PATENT DOCUMENTS

| 10,499,384 B2 | 12/2019 | He et al. |
| 10,506,579 B2 | 12/2019 | He et al. |
| 2018/0249458 A1 | 8/2018 | He et al. |
| 2018/0263021 A1 | 9/2018 | He et al. |
| 2019/0159175 A1* | 5/2019 | Islam ................ H04B 7/2621 |

(Continued)

FOREIGN PATENT DOCUMENTS

| CN | 105611637 A | 5/2016 |
| CN | 107925532 A | 4/2018 |
| WO | WO 2018/203791 A1 | 11/2018 |

OTHER PUBLICATIONS

International Search Report and Written Opinion of the International Searching Authority dated Mar. 31, 2020 in PCT/CN2020/071063, 9 pages.

(Continued)

*Primary Examiner* — Brian D Nguyen
(74) *Attorney, Agent, or Firm* — Oblon, McClelland, Maier & Neustadt, L.L.P.

(57) ABSTRACT

A method for providing multiple physical uplink control channel (PUCCH) resources for a uplink control information (UCI) report can include receiving one or more PUCCH resource configurations from a base station (BS) at a user equipment (UE) in a wireless communication system, and determining a first PUCCH resource configuration from the one or more PUCCH resource configurations for reporting a UCI. The first PUCCH resource configuration can indicate multiple frequency domain transmission occasions in a bandwidth. The UCI can be transmitted on at least one of the multiple frequency domain transmission occasions indicated by the first PUCCH resource configuration.

20 Claims, 12 Drawing Sheets

(56) References Cited

U.S. PATENT DOCUMENTS

2019/0313342 A1* 10/2019 Papasakellariou .. H04W 52/325
2019/0394767 A1   12/2019 Baldemair et al.
2020/0236672 A1*  7/2020 Myung ..................... H04L 5/00
2020/0245258 A1*  7/2020 Wang ................. H04W 52/146
2021/0006315 A1*  1/2021 Wu ...................... H04B 7/0626
2021/0068126 A1*  3/2021 Lou ................... H04W 28/0268

OTHER PUBLICATIONS

"UCI Transmission in NR Operations in Unlicensed" R1-1803682; 3GPP TSG RAN WG1 Meeting #92bis; Huawei, HiSilicon; Apr. 7, 2018, 6 pages.
Combined Taiwanese Office Action and Search Report dated Sep. 14, 2020 in Patent Application No. 109100401 (with English translation of categories of cited documents), 8 pages.
Combined Chinese Office Action and Search Report dated Mar. 11, 2021 in Chinese Patent Application No. 202080001291.X (with English translation of Categories of Cited Documents), 7 pages.

* cited by examiner

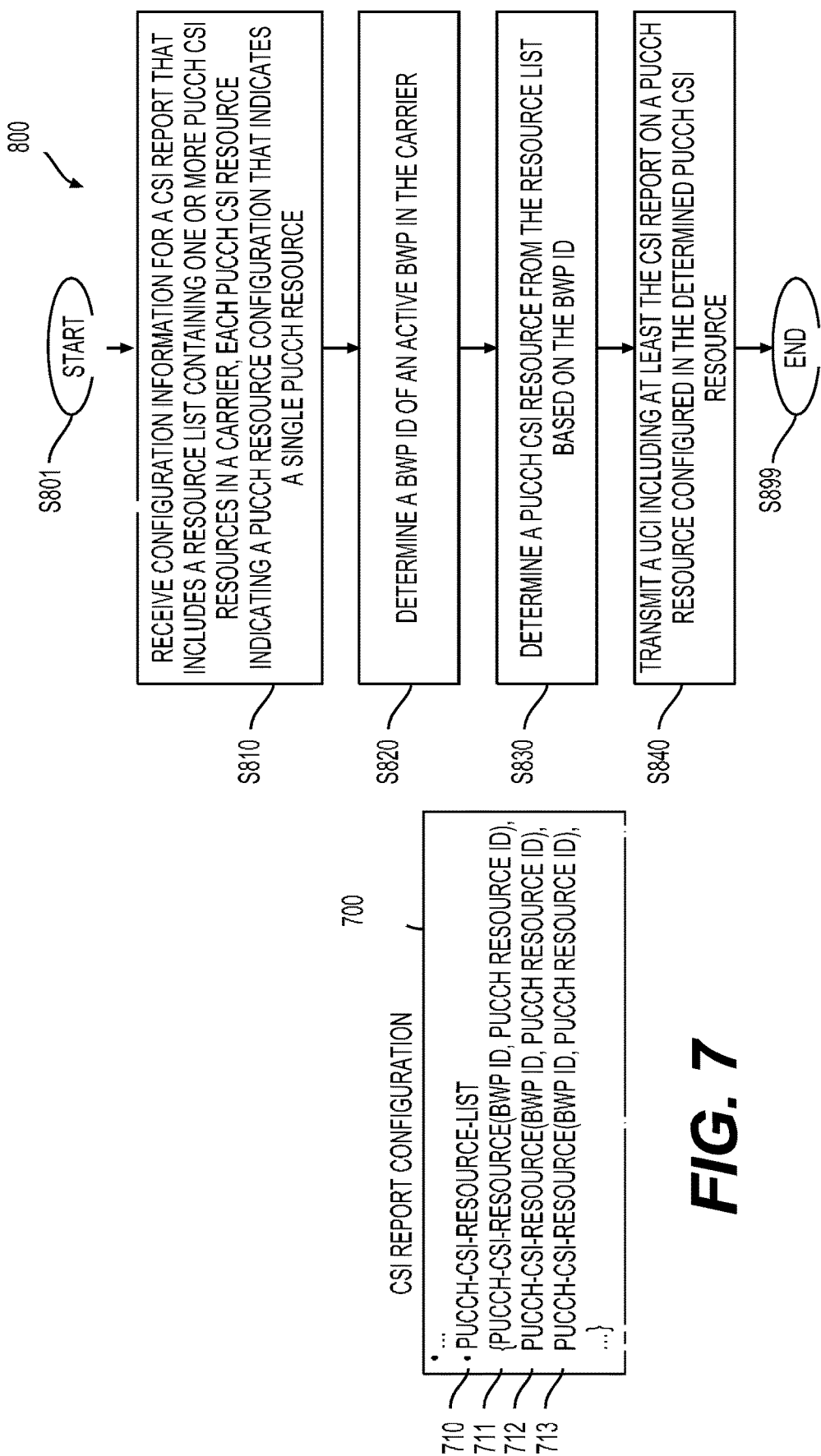

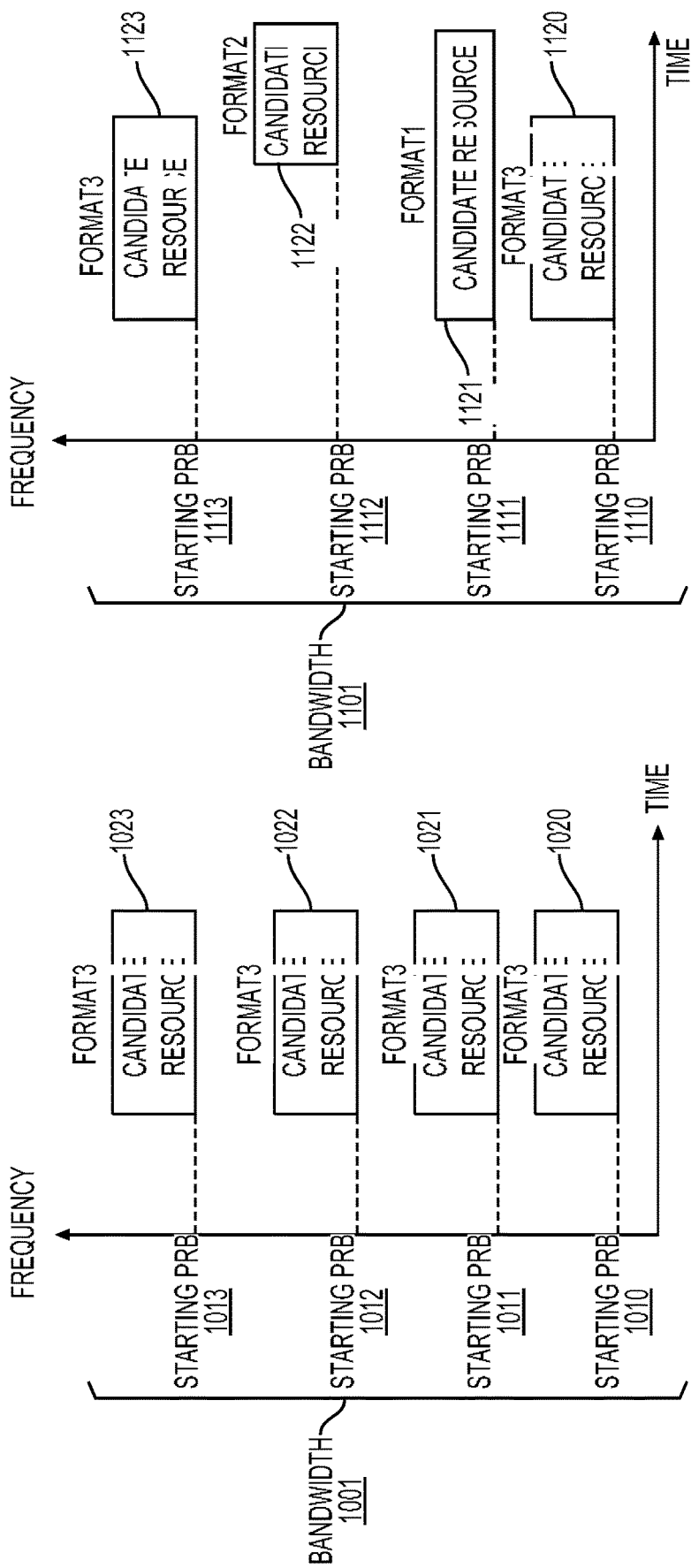

MULTIPLE PHYSICAL UPLINK CONTROL CHANNEL (PUCCH) RESOURCES FOR AN UPLINK CONTROL INFORMATION (UCI) REPORT

INCORPORATION BY REFERENCE

This present application claims the benefit of U.S. Provisional Application No. 62/790,155, "Multiple PUCCH Resources for Uplink Control Information Reporting" filed on Jan. 9, 2019, which is incorporated herein by reference in its entirety.

TECHNICAL FIELD

The present disclosure relates to wireless communications, and specifically relates to physical uplink control channel (PUCCH) resource configuration for uplink control information (UCI) reporting.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Uplink L1/L2 control signaling can be used to support data transmission on downlink or uplink transport channels. In Long Term Evolution (LTE) or New Radio (NR) networks, uplink control information (UCI) can be transmitted over resources specifically assigned for uplink L1/L2 control on physical uplink control channel (PUCCH). The UCI can include hybrid automatic repeat request acknowledgements (HARQ-ACKs) for received downlink shared channel (DL-SCH) transport blocks, channel state information (CSI) related to downlink channel conditions useful for downlink scheduling, and scheduling requests (SRs) indicating a device needs uplink resources for uplink shared channel (UP-SCH) transmission.

SUMMARY

Aspects of the disclosure provide a method for providing multiple physical uplink control channel (PUCCH) resources for an uplink control information (UCI) report. The method can include receiving one or more PUCCH resource configurations from a base station (BS) at a user equipment (UE) in a wireless communication system, and determining a first PUCCH resource configuration from the one or more PUCCH resource configurations for reporting a UCI. The first PUCCH resource configuration can indicate multiple frequency domain transmission occasions in a bandwidth. The UCI can be transmitted on at least one of the multiple frequency domain transmission occasions indicated by the first PUCCH resource configuration.

In an embodiment, the method can further include receiving a configuration of a PUCCH resource set that includes the first PUCCH resource configuration indicating the multiple frequency domain transmission occasions in the bandwidth. In an embodiment, the method can further include receiving a channel state information (CSI) reporting configuration indicating a bandwidth part (BWP) associated with the first PUCCH resource configuration indicating the multiple frequency domain transmission occasions in the bandwidth.

In an embodiment, the bandwidth includes multiple subbands, and the multiple frequency domain transmission occasions are distributed in different subbands included in the bandwidth. In an embodiment, the bandwidth includes multiple subbands, and the first PUCCH resource configuration indicates which subbands within the bandwidth are configured with the multiple frequency domain transmission occasions.

In an embodiment, the first PUCCH resource configuration indicates a starting resource unit in frequency domain for each of multiple candidate PUCCH resources that correspond to the respective multiple frequency domain transmission occasions. In an example, the multiple candidate PUCCH resources have the same starting resource unit with respect to respective subbands each containing one of the multiple candidate PUCCH resources. In an embodiment, the first PUCCH resource configuration can indicate a resource format for each of multiple candidate PUCCH resources that correspond to the respective multiple frequency domain transmission occasions. In an embodiment, the multiple candidate PUCCH resources have the same resource format.

Aspects of the disclosure provide an apparatus for providing multiple PUCCH resources for a UCI report. The apparatus can include circuitry configured to receive one or more PUCCH resource configurations from a BS in a wireless communication system, and determine a first PUCCH resource configuration from the one or more PUCCH resource configurations for reporting a UCI. The first PUCCH resource configuration can indicate multiple frequency domain transmission occasions in a bandwidth. The UCI can be transmitted on at least one of the multiple frequency domain occasions indicated by the first PUCCH resource configuration.

Aspects of the disclosure provide a non-transitory computer-readable medium that stores instructions implementing the method for providing the multiple PUCCH resources for the UCI report.

BRIEF DESCRIPTION OF THE DRAWINGS

Various embodiments of this disclosure that are proposed as examples will be described in detail with reference to the following figures, wherein like numerals reference like elements, and wherein:

FIG. 7 shows an example of a channel state information (CSI) report configuration 700;

FIG. 8 shows an example process 800 of providing a PUCCH resource for a CSI report;

FIG. 10 shows another example of providing multiple candidate PUCCH resources 1020-1023 for a UCI report or a PUCCH transmission according to some embodiments;

FIG. 11 shows another example of providing multiple candidate PUCCH resources 1120-1123 for a PUCCH transmission according to some embodiments;

DETAILED DESCRIPTION OF EMBODIMENTS

I. Multiple PUCCH Resources for a UCI Report

Figure 1:
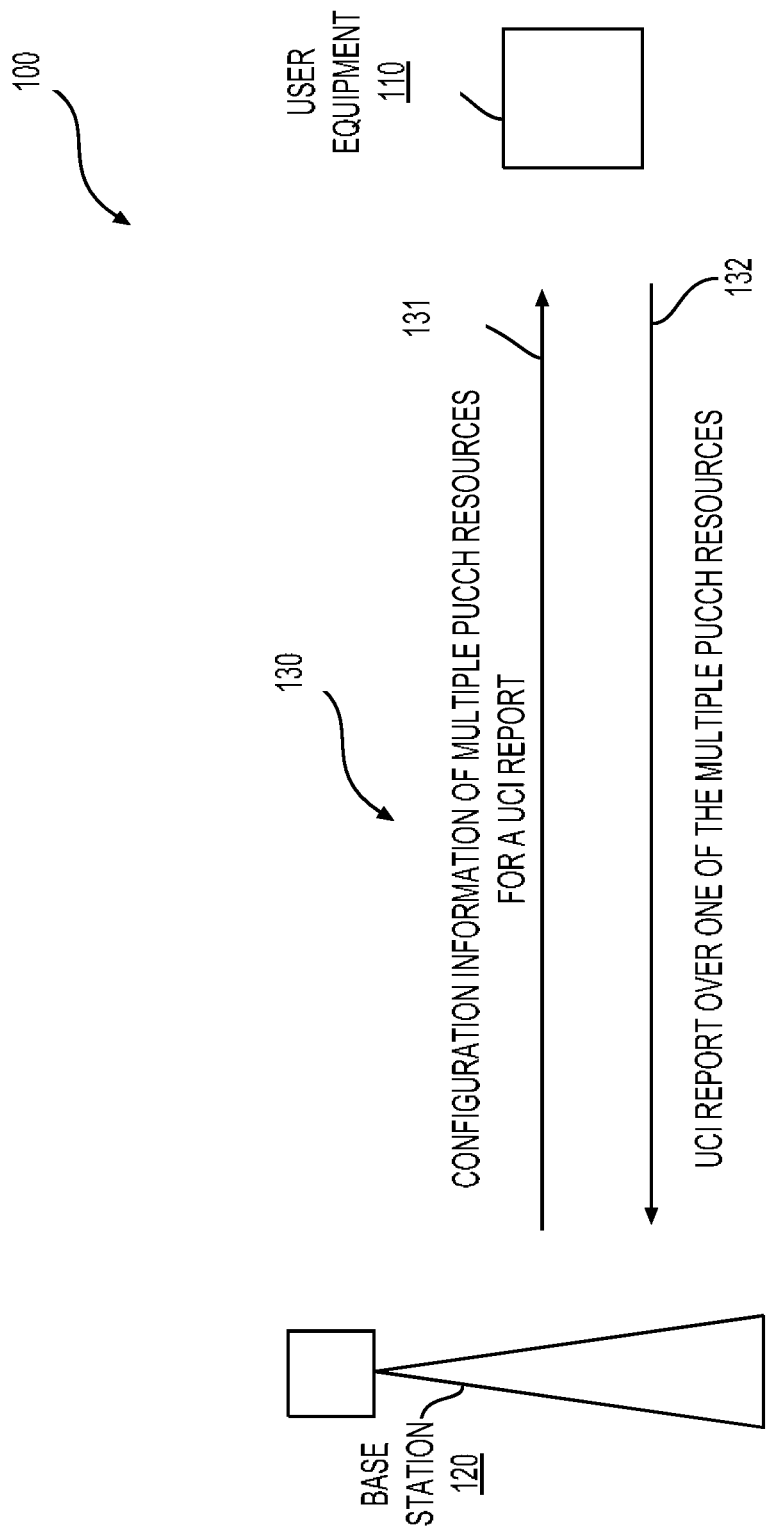
FIG. 1 shows a wireless communication system 100 and an uplink control information (UCI) reporting process 130 according to some embodiments of the disclosure.

FIG. 1 shows a wireless communication system 100 according to some embodiments of the disclosure. The system 100 can include a user equipment (UE) 110 and a base station (BS) 120. In some examples, the system 100 employs the fifth-generation (5G) New Radio (NR) air interface developed by the 3rd Generation Partnership Project (3GPP). In some examples, the system 100 employs other wireless communication technologies developed by various standard development organizations. In some examples, the system 100 employs non-standardized wireless communication technologies.

In some examples, the BS 120 can be a base station implementing a gNB node as specified in the 5G NR air interface standards developed by 3GPP. In one example, the BS 120 can be configured to control one or more antenna arrays to form directional Tx or Rx beams for transmitting or receiving wireless signals. The UE 110 can be a mobile phone, a laptop computer, a vehicle carried mobile communication device, a utility meter fixed at a certain location, and the like. Similarly, the UE 110 can employ one or more antenna arrays to generate directional Tx or Rx beams for transmitting or receiving wireless signals in one example. Depending on the air interface between the BS 120 and the UE 110, the BS 120 and the UE 110 can communicate with each other according to respective communication protocols.

In various embodiments, the UE 110 can transmit (or report) uplink control information (UCI) over a physical uplink control channel (PUCCH) to support data transmission on downlink or uplink transport channels. The UCI can include hybrid automatic repeat request acknowledgements (HARQ-ACKs) for received downlink shared channel (DL-SCH) transport blocks (or transport sub-blocks when code block grouping (CBG) is used), channel state information (CSI) related to downlink channel conditions useful for downlink scheduling, and scheduling requests (SRs) indicating the UE 110 needs uplink resources for uplink shared channel (UP-SCH) transmission.

A UCI can be transmitted over a PUCCH resource specifically assigned for PUCCH transmission. For example, the PUCCH resource can be a frequency domain and time domain physical transmission resource, such as resources of a number of symbols and a number of physical resource blocks (PRBs) over an orthogonal frequency division multiplex (OFDM) resource grid.

In an example (not shown in FIG. 1), corresponding to a UCI to be transmitted, one PUCCH resource can be configured by the BS 120 to the UE 110. The configuration can be performed, for example, through radio resource control (RRC) signaling, media access (MAC) layer control element (CE), downlink control information, or a combination thereof. Assuming the system 100 operates with a licensed spectrum, the configured PUCCH resource can readily be available for the UE 110. However, when an unlicensed spectrum is introduced to the system 100, configuration of a single PUCCH resource for UCI reporting over the unlicensed spectrum may be unreliable.

Figure 2A:
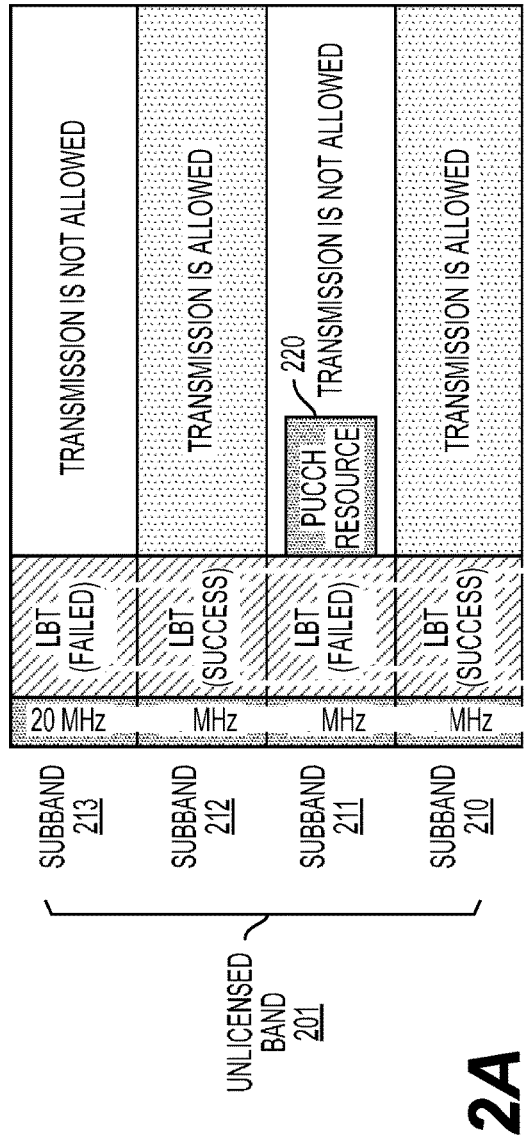
FIG. 2A shows a scenario where the system 100 operates over an unlicensed band 201.

FIG. 2A shows a scenario where the system 100 operates over an unlicensed band 201. The unlicensed band 201 is partitioned into subbands from 210 to 213 each, for example, having a bandwidth of 20 MHz. A PUCCH resource 220 can be configured by the BS 120 to the UE 110 for transmission of a UCI. Before the transmission of the UCI, the UE 110 can perform an access procedure, such as a listen before talk (LBT) access procedure, on each subbands 210-213 to determine whether the subbands 210-213 are available. As shown, the LBT access procedure can fail on the subbands 211 and 213 because transmission activities of another transmitter are detected in the subbands 211 and 213. In contrast, the LBT access procedure can be successful on the subbands 210 and 212 because transmission activities are not detected in the subbands 210 and 212. Accordingly, transmissions are allowed over the subbands 210 and 212 but not allowed over the subbands 211 and 213. The subbands 210-213 can be referred to as LBT subbands when a LBT access procedure is performed prior to access to those subbands.

The PUCCH resource 220 can be scheduled by the BS 120 in advance without knowledge of whether the respective subband 211 is available when the PUCCH 220 is to be transmitted. When the subband 211 is determined to be unavailable, the transmission of the PUCCH resource 220 may have to be given up. Failure of feedback of fatal information (e.g., HARQ-ACK) may degrade the performance of the system 100.

Figure 2B:
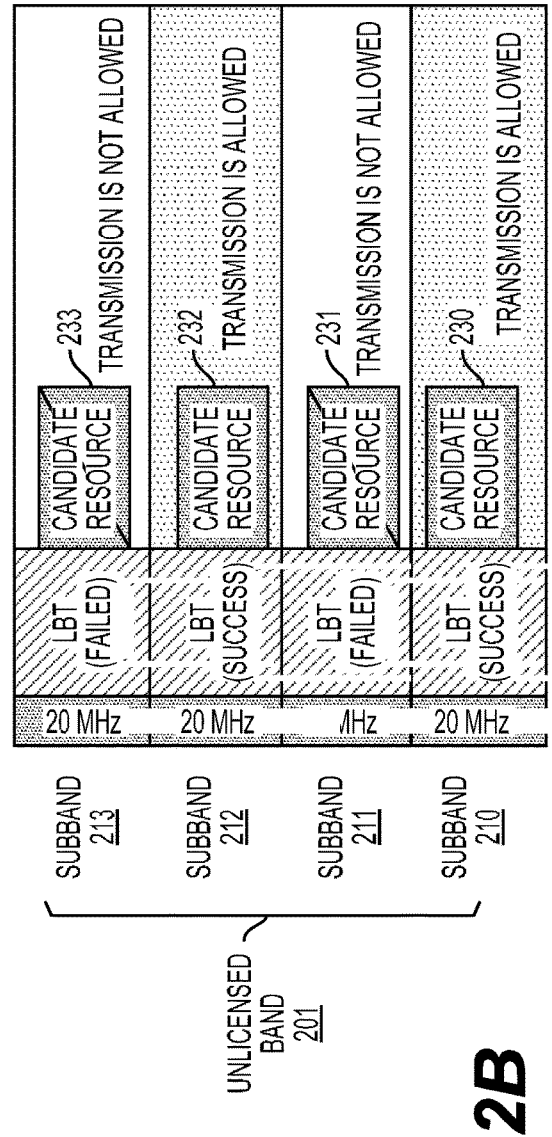
FIG. 2B shows a scenario where multiple candidate physical uplink control channel (PUCCH) resources 230-233 are configured that are distributed in the different subbands 210-213, respectively.

To improve the reliability of UCI reporting over an unlicensed spectrum, in some examples, multiple PUCCH resources can be configured for one UCI report or a respective PUCCH transmission. FIG. 2B shows a scenario where multiple candidate PUCCH resources 230-233 are configured that are distributed in the different subbands 210-213, respectively. As shown, when the subbands 210 and 212 are available as a result of the LBT access procedure, the candidate PUCCH resources 230 and 232 can be used for the UCI reporting. The UE 110 may select a PUCCH resource, for example, the PUCCH resource 230, from the candidate PUCCH resources 230 and 232 to perform the UCI transmission.

FIG. 1 shows a UCI reporting process 130 corresponding to the scenario of FIG. 2B. In a first step 131 of the process 130, configuration information of the multiple PUCCH resources 230-233 for one UCI report can be signaled from the BS 120 to the UE 110 through one or multiple times of signaling. Depending on content of the respective UCI (e.g., HARQ-ACK or CSI) to be reported from the UE to the BS 120 and methods employed for the UCI reporting, different configurations can be provided in the step 131. The UE 110 can accordingly determine or derive the multiple PUCCH resources 230-233. At a second step 132, the UE 110 can transmit the UCI over a PUCCH resource selected from the multiple PUCCH resources 230-233 configured in the first step 131 based on a result of a LBT access procedure.

In some embodiments, to realize configuration of multiple PUCCH resources distributed in different subbands, the BS 120 can signal a set of PUCCH resource configurations to the UE 110. Each PUCCH resource configuration can be identified by a PUCCH resource ID (also referred to as a PUCCH resource configuration ID). At least a subset of such PUCCH resource configurations can each indicate multiple candidate PUCCH resources within a slot in an OFDM resource grid for a UCI report. In addition, a PUCCH resource set configuration (e.g., for HARQ-ACK feedback) or a CSI report configuration (e.g., for CSI report) can be signaled to the UE 110. The PUCCH resource set configuration or the CSI report configuration can indicate some candidate PUCCH resource configurations, for example, by referring to some PUCCH resource IDs.

Subsequently, when it is time to perform a UCI report, the UE 110 can select a PUCCH resource configuration from the candidate PUCCH resource configurations indicated by the PUCCH resource set configuration or the CSI report configuration. As a PUCCH resource configuration can indicate multiple candidate PUCCH resources, the UE 110 can thus obtain multiple PUCCH resources as candidates for the UCI report.

The subbands 210-213 in the FIGS. 2A-2B examples can be included in a bandwidth part (BWP) or a component carrier configured to the UE 110. In other examples, the subbands 210-213 can each be configured as a component carrier, and be combined using a carrier aggregation scheme. In Further examples, the scheme of multiple PUCCH resources for UCI reporting can be configured over carriers in a licensed spectrum. Under such a configuration, a LBT procedure is not performed prior to access to a subband, and diverse PUCCH resources at different frequency and time locations can be provided to improve reliability of UCI reporting.

II. Single PUCCH Resource for UCI Reporting

Figure 3:
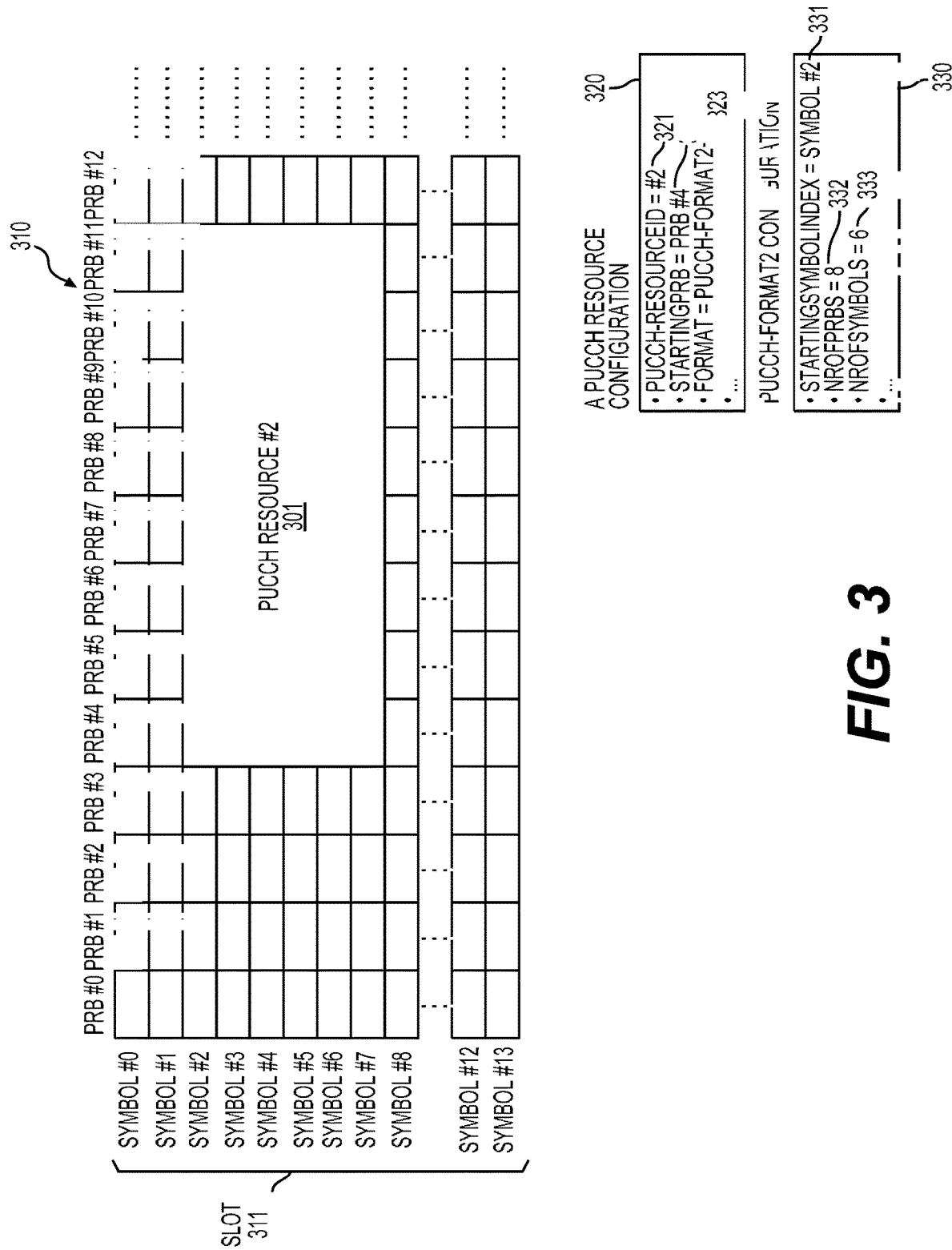
FIG. 3 shows examples of a PUCCH resource configuration 320, a resource format configuration 330, and a PUCCH resource 301.

1. HARQ-ACK Feedback with PUCCH Resource Configurations Each Indicating a Single PUCCH Resource FIG. 3 shows examples of a PUCCH resource configuration 320, a PUCCH resource 301 specified by the PUCCH resource configuration 320, and a resource format configuration 330 referred by the PUCCH resource configuration 320 to define the PUCCH resource 301. Particularly, the PUCCH resource configuration 320 provides only a single PUCCH resource. As shown, the PUCCH resource configuration 320 can indicate a PUCCH resource ID 321, a starting PRB in frequency domain 322, a resource format 323, and possibly other parameters. The resource format configuration 330, which specifies the resource format 323 indicated by the PUCCH resource configuration 320, can indicate a starting symbol 331, a number of PRBs 332 (optional), a number of symbols (optional) 333, and possibly other parameters. In some examples, when the number of PRBs 332 is equal to 1, the number of PRBs 332 can be omitted from the resource configuration 330. Similarly, when the number of symbols 333 is equal to 1, the number of symbols 333 can be omitted.

The PUCCH resource 301 is shown in an OFDM resource grid 310 as specified by the PUCCH resource configuration 320 and the resource format configuration 330. The resource grid 310 can include a sequence of PRBs in frequency domain each having an index (e.g., #0, #1, #2, and the like), and a sequence of symbols in frequency domain each having an index (e.g., #0, #1, #2, and the like). The PUCCH resource 301 can be located within a slot that, for example, includes 14 symbols having indices from #0 to #13. For example, the PUCCH resource 301 has a PUCCH resource ID of #2, starts from PRB #4 until PRB #11 (lasting for 8 PRBs) in frequency domain, and starts from symbol #2 until symbol #7 (lasting for 6 symbols). As shown, by a PUCCH resource configuration, a PUCCH resource in frequency and time domain can be identified.

Figure 4:
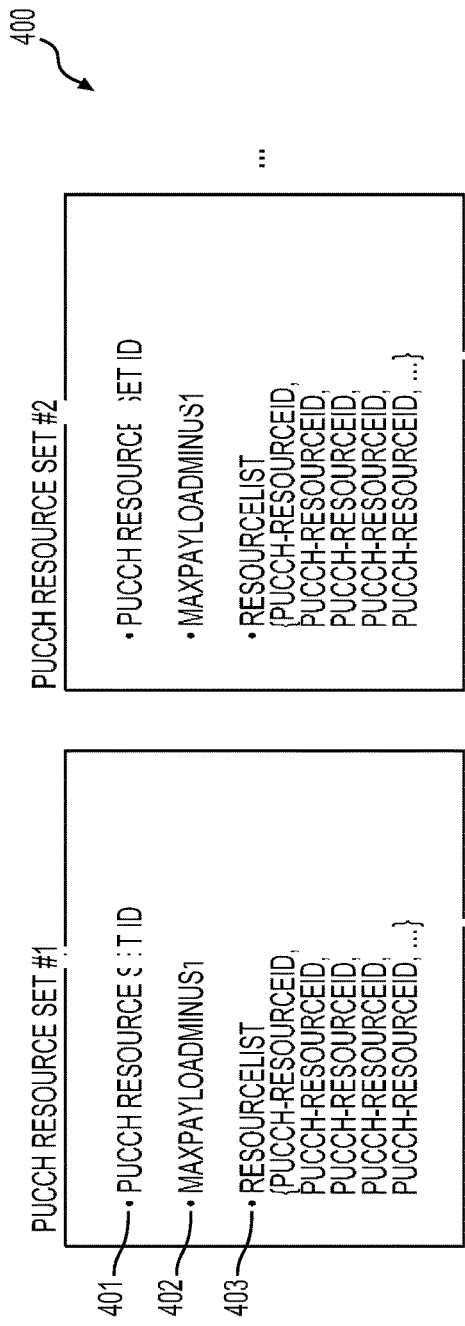
FIG. 4 shows an example of a PUCCH resource set configuration 400 for hybrid automatic repeat request acknowledgement (HARQ-ACK) feedback.

FIG. 4 shows an example of a PUCCH resource set configuration 400 for HARQ-ACK feedback. As shown, the PUCCH resource set configuration 400 can indicate a number (e.g., up to 4) of PUCCH resource sets (e.g., label with #1, #2, and so on). Each PUCCH resource set for HARQ-ACK reporting can include a PUCCH resource set ID (401), information of a unique maximum UCI payload size (402) (e.g., 2 bits, 10 bits, or 40 bits), and a resource list (403) including one or more PUCCH resource IDs. In the FIG. 4 example, the information of the maximum UCI payload size (402) is indicated in a form of the maximum payload size minus 1 (denoted by maxPayloadMinus1). According to the PUCCH resource ID in the resource list (403), a PUCCH resource configuration as described in the FIG. 3 example can be identified.

Figure 5:
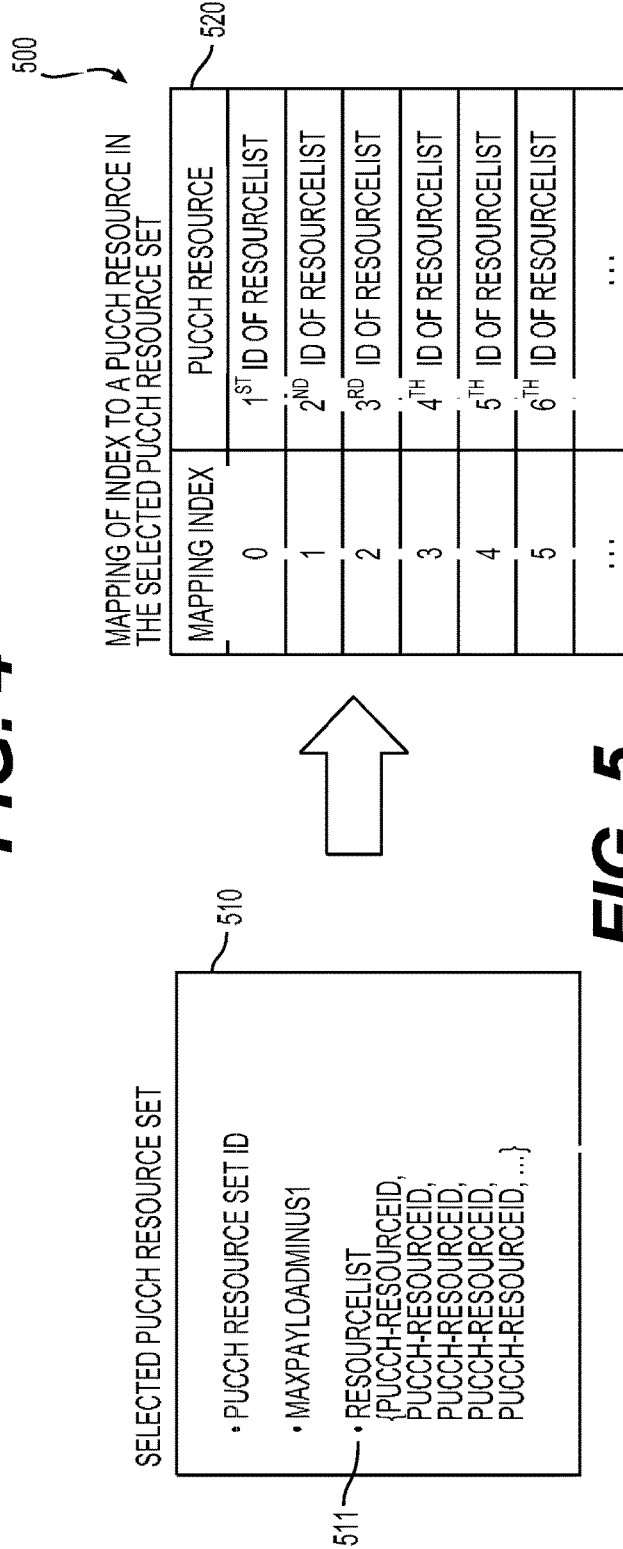
FIG. 5 shows an example of a procedure 500 for the UE 110 to determine which PUCCH resource from a selected PUCCH resource set 510 should be used for a HARQ-ACK feedback.

FIG. 5 shows an example of a process 500 for the UE 110 to determine which PUCCH resource ID from a selected PUCCH resource set 510 can be selected for a HARQ-ACK feedback. For example, configuration information of a number of PUCCH resource sets (e.g., up to 4) can be received by the UE 110. During a first step, the UE 110 may select one PUCCH resource set 510 from the configured PUCCH resource sets based on a payload size of a UCI to be transmitted. For example, the selected PUCCH resource set 510 can indicate a smallest maximum payload size that can accommodate the to-be-transmitted payload size among the configured PUCCH resource sets.

During a second step, based on an index (referred to as an indicating index) from a DCI that provides a downlink transmission, the UE 110 can select a PUCCH resource ID from a resource list 511 in the selected PUCCH resource set 510. The selection is illustrated in a mapping table 520 where different indices (referred to as mapping indices) are associated with different PUCCH resource IDs. Based on the selected PUCCH resource ID, a respective PUCCH resource configuration can be identified.

Each of the mapping indices in the mapping table 520 can be explicitly indicated by the indicating index conveyed by the UCI, or can be derived based on the indicating index conveyed by the UCI (implicitly indicated). For example, when the size of the resource list 511 is smaller than or equal to 8 in one example, the indicating index in a PUCCH resource indicator field (e.g., having a length of 3 bits) in the respective DCI can be used as the mapping index in the mapping table 520. In contrast, when the size of the resource list 511 is larger than 8 (e.g., 30), the mapping index used in the mapping table can be calculated based on the value (the indicating index) of the PUCCH resource indicator field and other parameters of corresponding PDCCH reception associated by the DCI.

Figure 6:
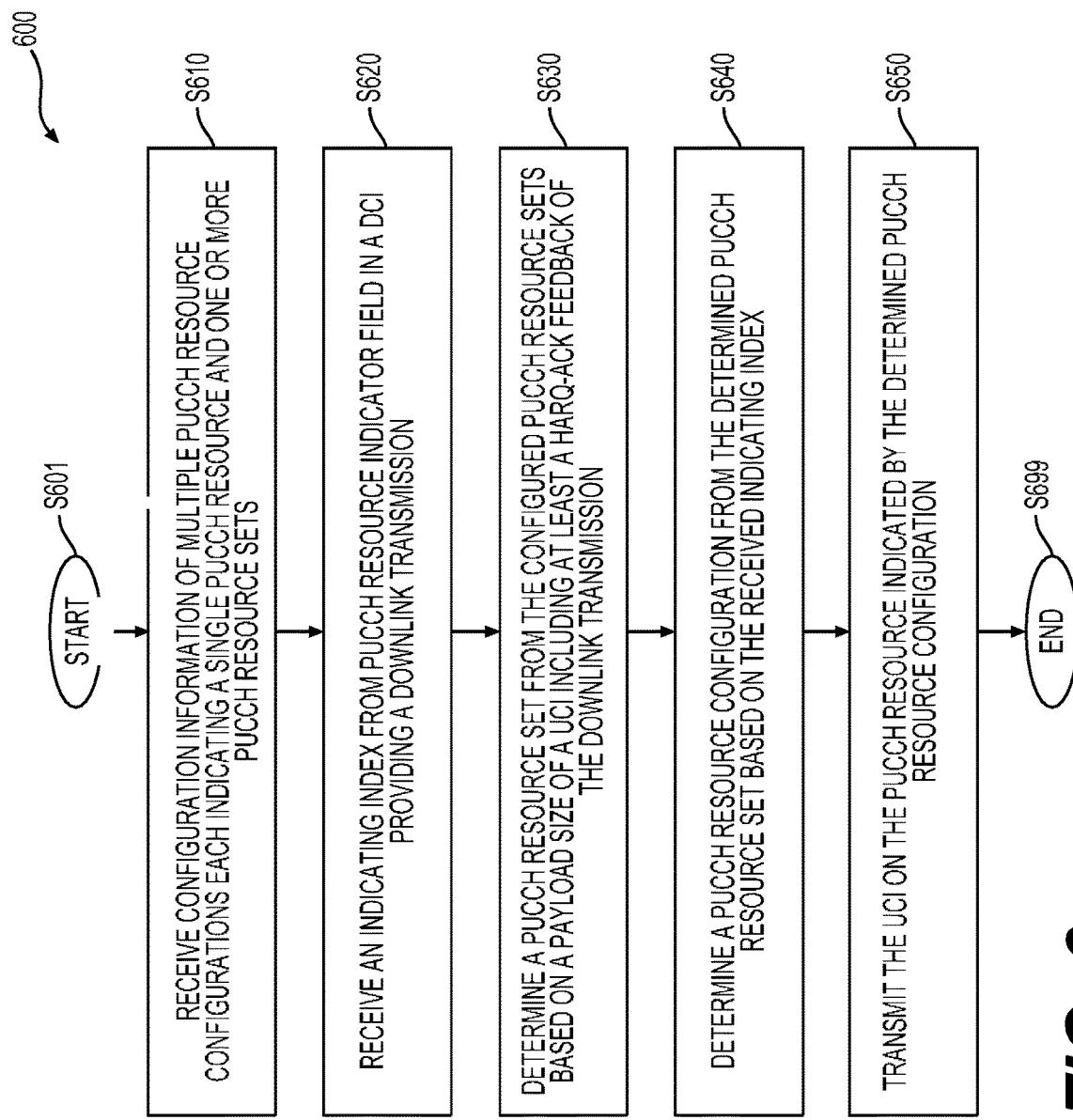
FIG. 6 shows an example process 600 of providing a PUCCH resource for a HARQ-ACK feedback.

FIG. 6 shows an example process 600 of providing a single PUCCH resource for a HARQ-ACK feedback. The process 600 can be performed at the UE 110. The system 100 is used to explain the process 600. The process 600 can start from S601 and proceed to S610.

At S610, configuration information of multiple PUCCH resource configurations each indicating a single PUCCH resource and one or more PUCCH resource sets can be received at the UE 110 from the BS 120, for example, by RRC signaling. The configuration information may be transmitted with separate RRC messages.

At S620, an indicating index from a PUCCH resource indicator field in a DCI providing a downlink transmission can be received. For example, the downlink transmission can be a transmission of a physical downlink shared channel (PDSCH), or a semi-persistent scheduling (SPS) PDSCH release. The DCI associated with the downlink transmission may indicate a PUCCH resource configuration (which indicates a PUCCH resource) for a HARQ-ACK feedback of reception of the downlink transmission by using a PUCCH resource indicator. Additionally, the DCI may provide a time offset (e.g., in terms of slots or symbols) with respect to the DCI or the downlink transmission to indicate a timing (e.g., which slot) of the PUCCH resource for the HARQ-ACK feedback.

A UCI carrying the HARQ-ACK feedback can be transmitted later over the indicated PUCCH resource in the indicated slot. In some examples, multiple downlink transmissions over a same or different carriers taking place over multiple time periods may be indicated with a same PUCCH resource, and HARQ-ACK feedbacks for the multiple downlink transmissions may form a code book and be transmitted using the indicated PUCCH resource. Thus, a payload size of the UCI carrying the code book may vary depending on the number of the multiple downlink transmissions.

In some examples, the BS 120 may request the UE 120 to provide a CSI report together with a HARQ-ACK feedback of a certain downlink transmission, which may increase the payload size of the UCI. Additionally, the UE 110 may need to send an SR to request for uplink transmission resources. The SR may also be included in the UCI.

At S630, a PUCCH resource set can be determined from the PUCCH resource sets configured at S610 based on the payload size of the UCI including at least the HARQ-ACK feedback of the downlink transmission at S620.

At S640, the PUCCH resource configuration can be determined from the PUCCH resource set determined at S630 based on the indicating index received at S620. For example, the indicating index can explicitly or implicitly indicate a mapping index to a PUCCH resource ID on a PUCCH resource list in the PUCCH resource set determined at S630.

At S650, the UCI can be transmitted on the PUCCH resource indicated by the PUCCH resource configuration determined at S640. The process 600 can then proceed to S699 and terminates at S699.

In the process 600, the PUCCH resource set having a certain maximum UCI payload size may provide multiple PUCCH resource configurations that are suitable for different types of PUCCH structures. For example, compared with Long Term Revolution (LTE), more flexible PUCCH structures are defined in NR to target different applications and use cases. A NR PUCCH structure can have a short or a long duration. The short duration PUCCH may span 1 or 2 symbols in a slot, and be multiplexed with downlink or uplink data channel in a time division multiplexing (TDM) manner. For example, a short duration PUCCH can be inserted in the last part of one slot to enable fast HARQ-ACK feedback. In contrast, a long duration PUCCH may span 4 to 11 symbols, and be multiplexed in a frequency division multiplexing (FDM) manner in a slot. The long duration PUCCH may thus provide adequate coverage and robustness desired by some use cases.

Accordingly, at the step S620, the BS 120 can determine the indicating index corresponding to the PUCCH resource configuration based on a respective PUCCH structure suitable for a specific application and, optionally, other parameters (e.g., a channel condition, UE capability, and the like). The indicating index is subsequently provided to the UE 110.

2. CSI Reporting with PUCCH Configurations Each Indicating a Single PUCCH Resource In some examples, the UE 110 may perform CSI reporting according to a CSI report configuration. For example, the UE 110 operating on a carrier can be configured with one or more BWPs (e.g., up to four BWPs). Each BWP can be a contiguous set of PRBs selected from the carrier. As configured, each BWP can have a BWP ID, a certain frequency location, a size, a numerology and control resource sets (CORSETs). Typically, one BWP is active among the multiple configured BWPs at a given time. The UE 110 may not transmit a PUSCH or PUCCH over non-active BWPs. For purpose of CSI reporting, the CSI report configuration can specify a PUCCH resource (e.g., specifying a PUCCH resource configuration ID) per BWP. While operating in an active BWP, in response to a request of the BS 120, the UE 110 may determine a PUCCH resource configured in the active BWP, and transmit a CSI report over the PUCCH resource.

FIG. 7 shows an example of a CSI report configuration 700. The CSI report configuration can include a PUCCH CSI resource list 710 among other parameters. The PUCCH CSI resource list 710 can include one or more PUCCH CSI resources 711-713. Each PUCCH CSI resource can include a BWP ID and a PUCCH resource ID (or referred to as a PUCCH resource configuration ID). As can be seen, a PUCCH resource specified by a PUCCH resource configuration corresponding to the respective PUCCH resource ID can be configured for each BWP represented by the BWP ID.

FIG. 8 shows an example process 800 of providing a single PUCCH resource for a CSI report of a BWP. The process 800 can be performed at the UE 110. The system 100 is used to explain the process 800. The process 800 can start from S801 and proceed to S810.

At S810, configuration information for a CSI report can be received. The configuration information can include a PUCCH CSI resource list 1810 including one or more PUCCH CSI resources 1811-1813 in a component carrier. Each PUCCH CSI resource 1811-1813 specifies a PUCCH resource ID associated with a BWP ID. The configuration information may further include one or more PUCCH resource configurations each associated with a PUCCH resource ID. Each PUCCH resource configuration can indicate a single PUCCH resource. The configuration information can be signaled from the BS 120 to the UE 110, for example, through one or multiple messages of RRC signaling.

The UE 110 may operate on the carrier that is partitioned into multiple BWPs. Each BWP can be associated with the BWP IDs indicated in the PUCCH CSI resource list. Thus, based on the received PUCCH CSI resources in the PUCCH CSI resource list, a PUCCH resource ID can be determined for each BWP of the carrier using the respective BWP ID. Based on the PUCCH resource ID, a PUCCH resource configuration (and the respective PUCCH resource) can be determined for the respective BWP.

The BS 120 can request the UE 110 to perform the CSI report, for example, through RRC, MAC CE, or DCI signaling. A request from the BS 120 may specify a timing (e.g., which slot) for the CSI report. Alternatively, a request from the BS 120 may specify a sequence of timings for the UE 110 to periodically perform CSI reporting.

At S820, a BWP ID of an active BWP in the carrier can be determined in order to perform the CSI report.

At S830, a PUCCH CSI resource can be determined from the PUCCH CSI resource list received at S810 based on the BWP ID determined at S820.

At S840, a UCI including at least the CSI report can be transmitted at the indicated timing and on a PUCCH resource configured in the PUCCH CSI resource determined at S830. The process 800 can proceed to S899, and terminates at S899.

III. Multiple PUCCH Resources for UCI Reporting

In some embodiments, multiple frequency domain transmission occasions can be provided. For example, a PUCCH transmission can take place in a slot (e.g., including 14 OFDM symbols). Multiple candidate PUCCH resources corresponding to the frequency domain transmission occasions can be configured in the slot. The multiple candidate PUCCH resources can be distributed in different subbands within a bandwidth. For example, the subbands can be included in a BWP or a component carrier. Or, the subbands can each be a component carrier and combined using a carrier aggregation scheme. The subbands can be part of a licensed spectrum or an unlicensed spectrum. A LBT access procedure may be performed prior to access to a subband of an unlicensed spectrum.

In order to provide multiple frequency domain transmission occasions (or multiple candidate PUCCH resources) for a PUCCH transmission, a PUCCH resource configuration indicating multiple frequency domain transmission occasions can be employed. For example, a PUCCH resource configuration can include information of one or more frequency domain transmission occasions within a bandwidth. For each frequency domain transmission occasion, a candidate PUCCH resource can be specified by the PUCCH resource configuration. For example, a starting resource unit in frequency domain and a resource format can be indicated for each frequency domain transmission occasion (or respective candidate PUCCH resource) for the PUCCH transmission.

In addition, the resource formats (e.g., a size of the resource in frequency and time domain, or a starting resource unit in time domain) for different candidate PUCCH resources can be the same or can be different in various embodiments.

Figure 9:
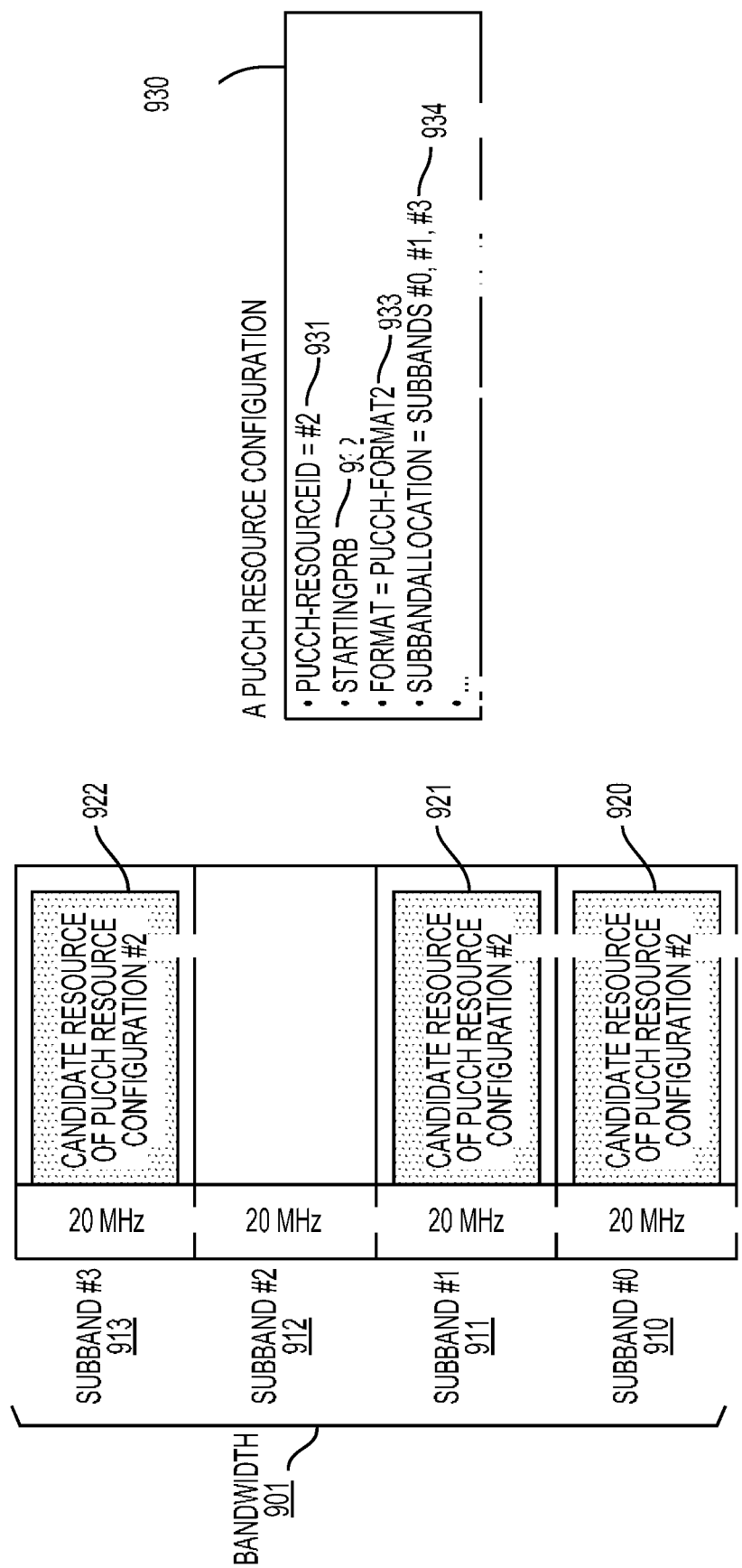
FIG. 9 shows an example of a PUCCH resource configuration 930 providing multiple candidate PUCCH resources 920-922 for a UCI report or a PUCCH transmission according to some embodiments.

FIG. 9 shows an example of a PUCCH resource configuration 930 providing multiple candidate PUCCH resources 920-922 for a UCI report or a PUCCH transmission according to some embodiments.

As shown, multiple subbands 910-913 are partitioned from a bandwidth 901. The bandwidth 901 can be an individual carrier or a BWP. The subbands 910-913 can be unlicensed or licensed spectra. As an example, the subbands 910-913 are shown to each have a bandwidth of 20 MHz.

To improve reliability of the PUCCH transmission, multiple candidate PUCCH resources 920-922 distributed in different subbands 910/911/913 and within a same slot are configured. For example, an LBT access procedure can be performed prior to access to the subbands 910-913 (not shown in the FIG. 9 example). The candidate PUCCH resources allocated over the available subbands can be used for the PUCCH transmission at an intended slot.

Configuration of the multiple candidate PUCCH resources 920-922 can be specified by the PUCCH resource configuration 930. As shown, the PUCCH resource configuration 930 can indicate a PUCCH resource ID (or referred to as a PUCCH resource configuration ID) 931 denoted by PUCCH-ReouceID equal to #2. The PUCCH resource ID or PUCCH resource configuration ID (e.g., #2) is shared by the multiple candidate PUCCH resources 920-922. The PUCCH resource configuration can further indicate a starting resource unit 932 in frequency domain. For example, the starting resource unit 932 in frequency domain can be denoted by startingPRB, and provided in terms of a PRB index. The PRB index can be an index number with respect to a frequency domain starting resource unit of a subband.

The PUCCH resource configuration 930 can further include a resource format 933 (e.g., PUCCH-format2). The resource format 933 can be described with a PUCCH format configuration, such as a configuration similar to the PUCCH format configuration 330 in the FIG. 3 example. The PUCCH resource configuration can further include subband allocation information 934. For example, in the subband allocation information 934 (denoted by subbandAllocation), a list of subband IDs (e.g., #0, #1, and #3) can be provided, which indicates which subbands among the subbands 910-913 are allocated with a candidate PUCCH resource. Based on the starting resource unit 932, the resource format 933, and the subband allocation information 934, the candidate PUCCH resources 920-922 can be determined as shown in FIG. 9. The PUCCH resource configuration may include other parameters in some examples.

It is noted that what is shown in FIG. 9 is just a particular example. In other examples, the PUCCH resource configuration 930 can take different forms, and the respective PUCCH resources 920-922 indicated by the PUCCH resource configuration 930 can take different shapes/positions. For example, while similar candidate PUCCH resources 920-922 in terms of size and starting resource units in frequency and time domains are configured in different subbands 910/911/913 as shown in FIG. 9, candidate PUCCH resources having different sizes and locations can be configured for different subbands in other embodiments. For another example, in a PUCCH resource configuration taking a different form, resource configuration information (e.g., the starting resource unit 932 and the resource format 933) can be provided separately for each subband listed in the subband allocation information 934.

FIG. 10 shows another example of providing multiple candidate PUCCH resources 1020-1023 for a UCI report or a PUCCH transmission according to some embodiments. As shown, the candidate PUCCH resources 1020-1023 can be distributed in a bandwidth 1001, and have different frequency domain starting resource units identified by respective starting PRBs 1010-1013. The candidate PUCCH resources 1020-1023 can be located within a slot (e.g., having 14 OFDM symbols) in time domain. The candidate PUCCH resources 1020-1023 can have a same resource format (e.g., format 3).

The candidate PUCCH resources 1020-1023 in FIG. 10 can be configured to the UE 110 by signaling a PUCCH resource configuration to the UE 110. The PUCCH resource configuration can indicate the frequency domain starting resource units of the candidate PUCCH resources 1020-1023, for example, by specifying indices of the starting PRBs 1010-1013. In addition, the PUCCH resource configuration can indicate the resource format (e.g., format 3) for the PUCCH resources 1020-1023.

When the UE 110 is to send a UCI report to the BS 120 at an intended slot, the PUCCH resource configuration (e.g., identified by a PUCCH resource ID) can be selected among other PUCCH resource configurations signaled to the UE 110. The UE 110 can further select at least one of the candidate PUCCH resources 1020-1023 to transmit the UCI report at the intended slot.

FIG. 11 shows another example of providing multiple candidate PUCCH resources 1120-1123 for a PUCCH transmission according to some embodiments. Similar to the FIG. 10 example, the PUCCH resources 1120-1123 can be distributed within a bandwidth 1101, and have frequency domain starting resource unitsat starting PRBs 1110-1113, respectively. However, different candidate PUCCH resources 1120-1123 may be configured with different resource formats. As shown, the candidate PUCCH resources 1120 and 1123 have a resource format of format 3, while the candidate PUCCH resources 1121 and 1122 have resource formats of format 1 and format 2, respectively. Thus, different PUCCH resources can have different sizes in frequency and time domains and different locations in time domain.

Similarly, the candidate PUCCH resources 1120-1123 can be configured to the UE 110 by transmit a PUCCH resource configuration through a high level signaling (e.g., RRC signaling). The PUCCH resource configuration can specify the parameters (e.g., the frequency domain starting resource units, the resource formats, and the like) for indicating the candidate PUCCH resources 1120-1123.

Figure 12:
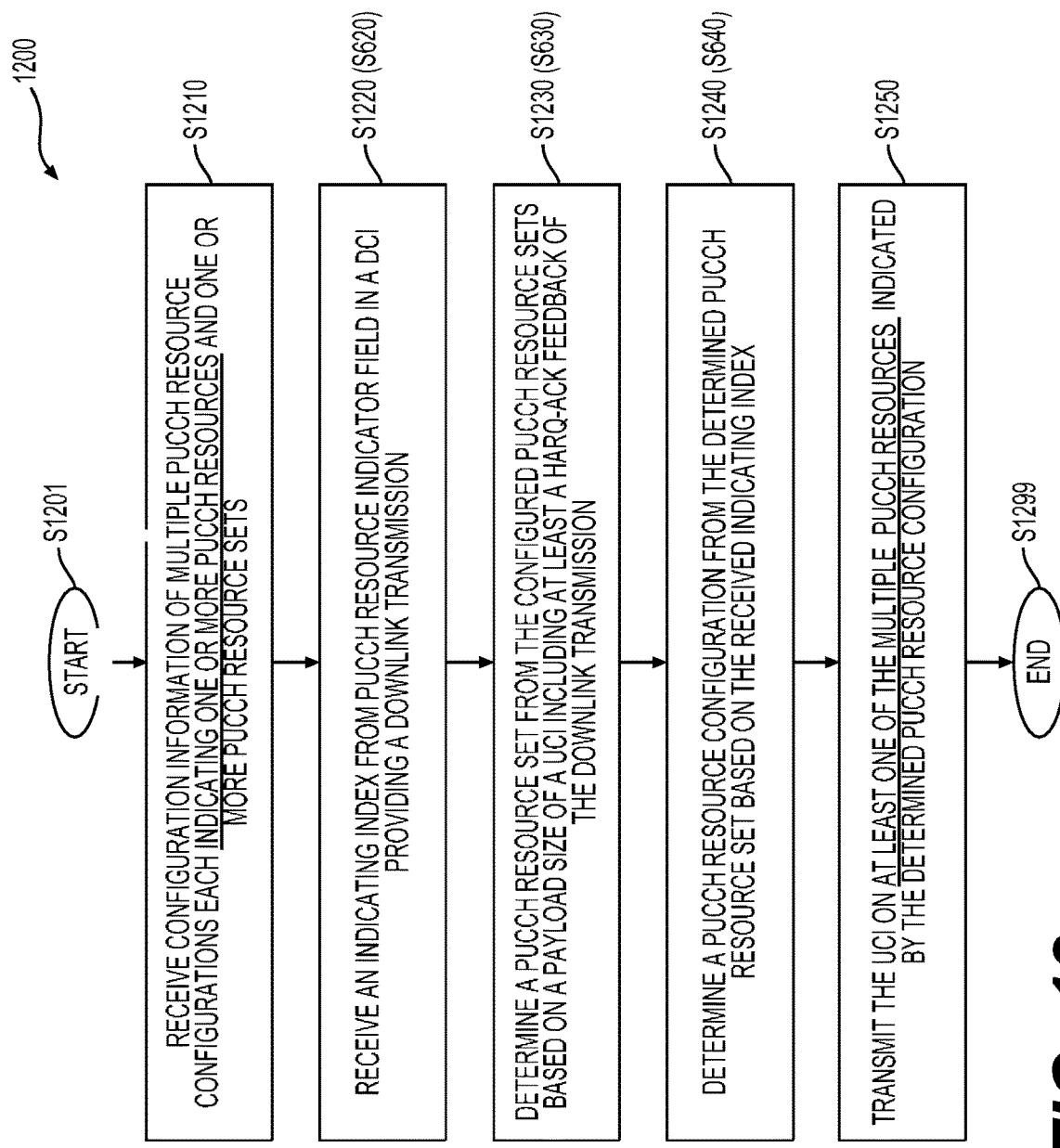
FIG. 12 shows an example process 1200 of providing multiple PUCCH resources for a HARQ-ACK feedback according to an embodiment of the disclosure.

FIG. 12 shows an example process 1200 of providing multiple PUCCH resources for a HARQ-ACK feedback according to an embodiment of the disclosure. The process 1200 can be performed at the UE 110. The system 100 is used as an example for explanation of the process 1200. The process 1200 is compared with the process 600 in the FIG. 6 example, and differences between descriptions of the process 1200 and the process 600 are highlighted with underlines. The process 1200 starts from S1201, and proceeds to S1210.

At S1210, the UE 110 can receive from the BS 120 configuration information of multiple PUCCH resource configurations and one or more PUCCH resource sets, which is similar to S610 in the FIG. 6 example. However, each of PUCCH resource configurations can indicate one or more candidate PUCCH resources as described in the FIGS. 9-11 examples.

The steps from S1220 to S1240 can be similar to the steps from S620 to S640 in the FIG. 6 example. As a result of the steps S1220-1240, a PUCCH resource configuration is determined from the multiple PUCCH resource configurations received as S1210 for reporting a UCI including at least a HARQ-ACK feedback.

At S1250, the UCI is transmitted with at least one of the multiple candidate PUCCH resources indicated by the PUCCH resource configuration determined at S1240, if the determined PUCCH resource configuration indicates multiple candidate PUCCH resources. For example, the UE 110 may select one or more PUCCH resources from the multiple candidate PUCCH resources for the UCI report. For example, one copy of the UCI can be transmitted using the one or more PUCCH resources, or multiple copies of the UCI can be transmitted using multiple PUCCH resources. The process 1200 can proceed to S1299 and terminates at S1299.

Figure 13:
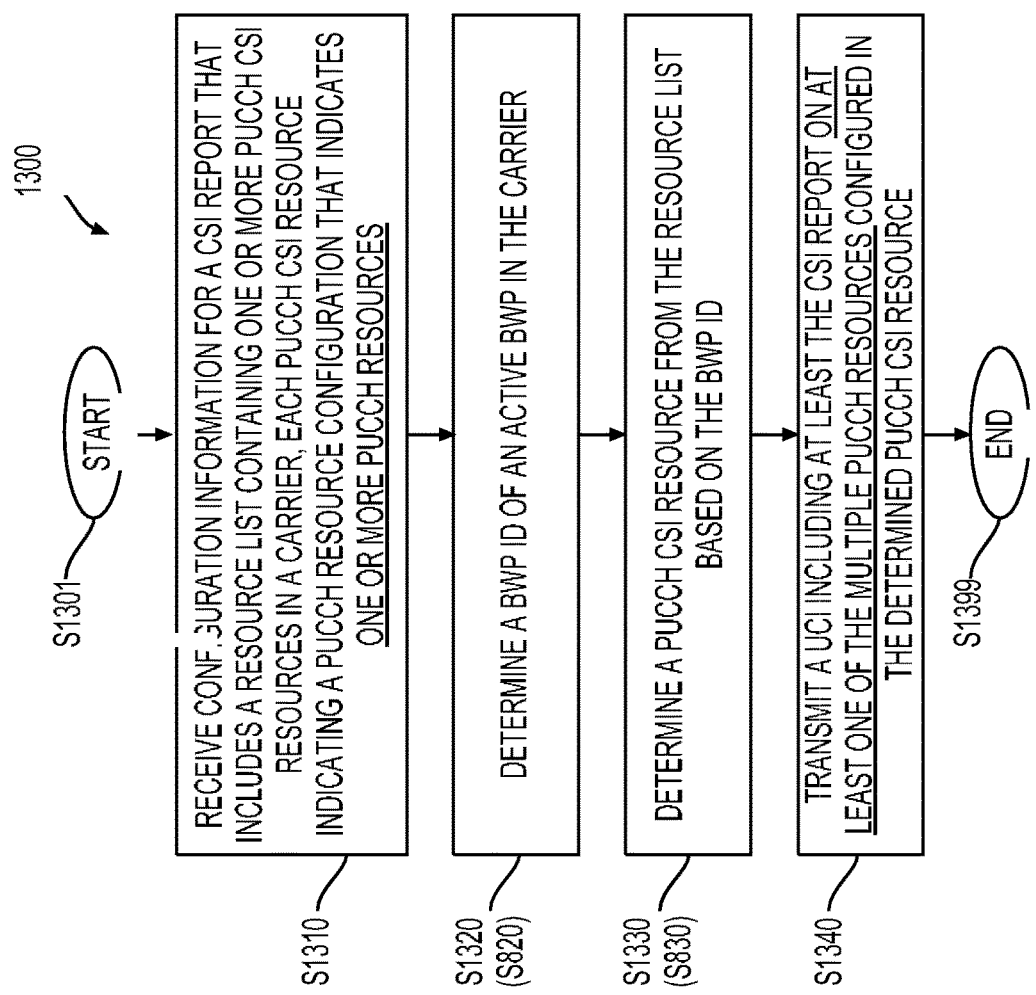
FIG. 13 shows an example process 1300 of providing multiple PUCCH resources for a CSI report according to an embodiment of the disclosure.

FIG. 13 shows an example process 1300 of providing multiple PUCCH resources for a CSI report according to an embodiment of the disclosure. Similar to the process 1200, the process 1300 can be performed at the UE 110. The system 100 is used as an example for explanation of the process 1300. The process 1300 is compared with the process 800 in the FIG. 8 example, and differences between descriptions of the process 1300 and the process 800 are highlighted with underlines. The process 1300 starts from S1301, and proceeds to S1310.

At S1310, similar to S810 in the FIG. 8 example, configuration information for a CSI report can be received. The received CSI report configuration can include a resource list containing one or more PUCCH CSI resources. Each PUCCH CSI resources can indicate a PUCCH resource configuration (e.g., an ID) for a BWP. Different from the FIG. 8 example, each of the PUCCH resource configuration can indicate one or more candidate PUCCH resources as described in the FIGS. 9-11 examples.

The steps of S1320 and S1330 can be similar to S820 and S830 in the FIG. 8 example. A PUCCH CSI resource can be determined at S1330 by referring to a PUCCH resource configuration ID.

At S1340, a UCI including at least the CIS report can be transmitted on at least one of the multiple candidate PUCCH resources configured in the PUCCH CSI resource determined at S1330, if the determined PUCCH CSI resource indicates multiple candidate PUCCH resources. The process 1300 can proceed to S1399 and terminates at S1399.

Figure 14:
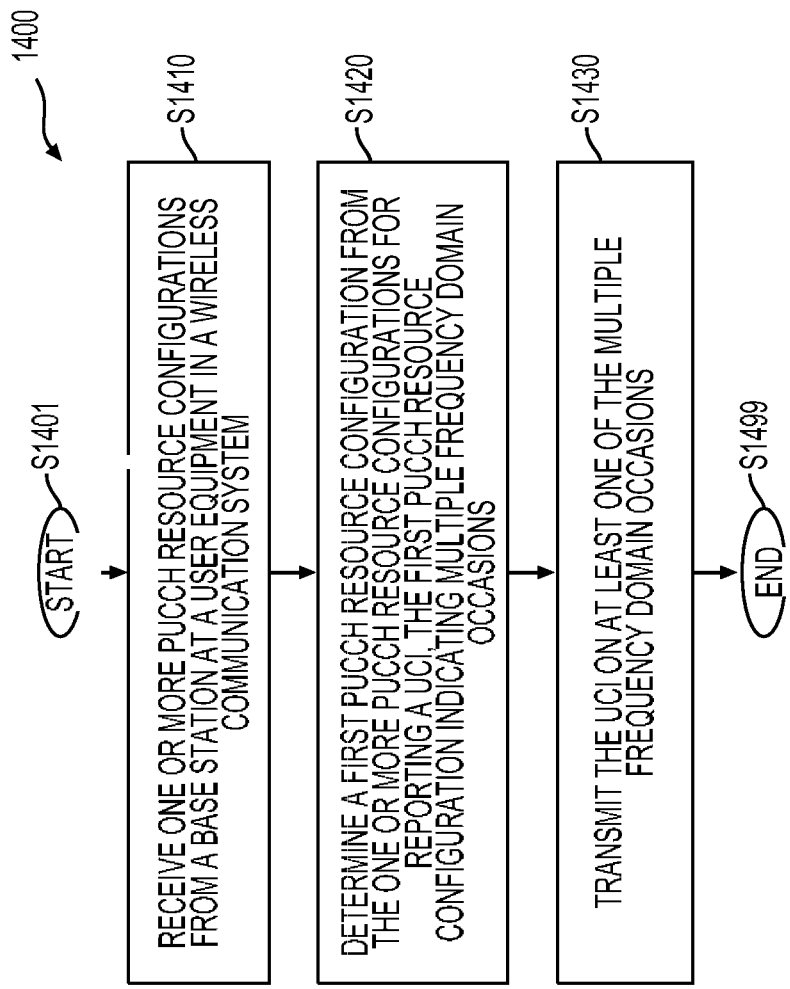
FIG. 14 shows an example process 1400 of providing multiple frequency domain transmission occasions for a UCI report or a PUCCH transmission according to an embodiment of the disclosure.

FIG. 14 shows an example process 1400 of providing multiple frequency domain transmission occasions for a UCI report or a PUCCH transmission according to an embodiment of the disclosure. The process 1400 can be performed at the UE 110. The system 100 is used to explain the process 1400. The process 1400 can start from S1401 and proceed to S1410.

At S1410, one or more PUCCH resource configurations can be received from the BS 120 at the UE 110 in the system 100. In some examples, each PUCCH resource configuration can indicate multiple frequency domain transmission occasions within a slot in an OFDM resource grid. The multiple frequency domain transmission occasions can be multiple candidate PUCCH resources distributed in a bandwidth in frequency domain and within the slot in time domain.

Each PUCCH resource configuration can indicate starting resource units in frequency domain for the respective multiple candidate PUCCH resources, and a same or different resource format for each of the respective multiple candidate PUCCH resources. In some examples, the bandwidth may include subbands (e.g., LBT subbands), and all or a part of the subbands can be indicated in each PUCCH resource configuration and associated with one of the respective multiple candidate PUCCH resources. In some examples, only a subset of the received PUCCH resource configurations indicate multiple frequency domain transmission occasions.

At S1420, a first PUCCH resource configuration is determined from the one or more PUCCH resource configurations received at S1210 for reporting a UCI. The UCI is to be transmitted in a PUCCH transmission over a slot from the UE 110 to the BS 120. The first PUCCH resource configuration can indicate multiple frequency domain transmission occasions in a bandwidth for the PUCCH transmission over the slot.

In a first scenario, the UCI can include at least a HARQ-ACK feedback. In the first scenario, the UE 110 may further receive a PUCCH resource set configuration defining a set of PUCCH resource sets. Subsequently, the first PUCCH resource configuration can be determined through operations similar to that of the steps from S1220-S1240 in the FIG. 12 example.

In a second scenario, the UCI can include at least a CSI report of a BWP. In the second scenario, the UE 110 may further receive a CSI report configuration indicating PUCCH resource configurations each associated with a BWP. Subsequently, the first PUCCH resource configuration can be determined through operations similar to that of the steps from S1320-S1230 in the FIG. 13 example.

In other scenarios, the first PUCCH resource configuration may be determined for reporting the UCI in a different manner from the first or the second scenarios.

At S1430, the UCI for the HARQ-feedback or the CSI report can be transmitted on at least one of the multiple frequency domain transmission occasions indicated by the first PUCCH resource configuration. The process 1400 can proceed to S1499 and terminates at S1499.

IV. Apparatus and Computer Readable Medium

Figure 15:
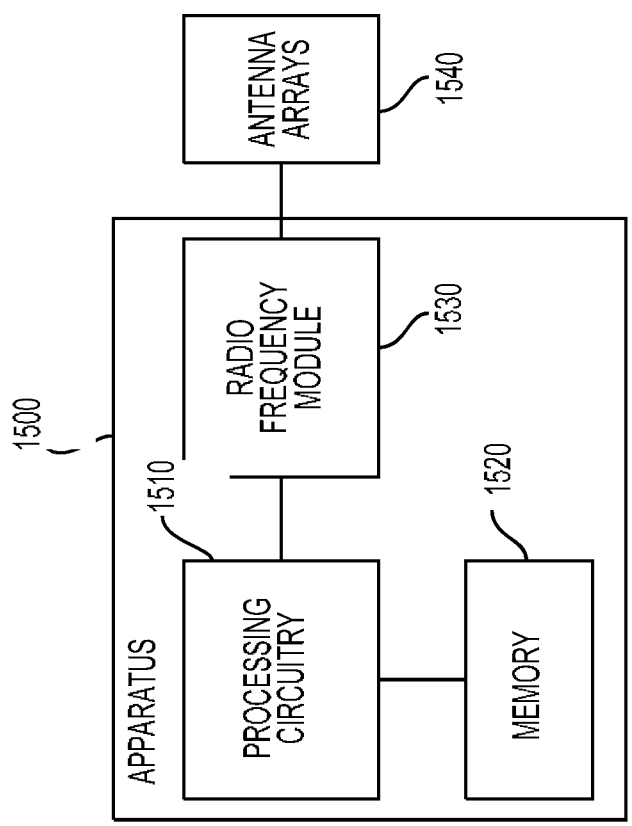
FIG. 15 shows an example apparatus 1500 according to embodiments of the disclosure.

FIG. 15 shows an example apparatus 1500 according to embodiments of the disclosure. The apparatus 1500 can be configured to perform various functions in accordance with one or more embodiments or examples described herein. Thus, the apparatus 1500 can provide means for implementation of mechanisms, techniques, processes, functions, components, systems described herein. For example, the apparatus 1500 can be used to implement functions of the UEs or BSs in various embodiments and examples described herein. The apparatus 1500 can include a general purpose processor or specially designed circuits to implement various functions, components, or processes described herein in various embodiments. The apparatus 1500 can include processing circuitry 1510, a memory 1520, and a radio frequency (RF) module 1530.

In various examples, the processing circuitry 1510 can include circuitry configured to perform the functions and processes described herein in combination with software or without software. In various examples, the processing circuitry 1510 can be a digital signal processor (DSP), an application specific integrated circuit (ASIC), programmable logic devices (PLDs), field programmable gate arrays (FPGAs), digitally enhanced circuits, or comparable device or a combination thereof.

In some other examples, the processing circuitry 1510 can be a central processing unit (CPU) configured to execute program instructions to perform various functions and processes described herein. Accordingly, the memory 1520 can be configured to store program instructions. The processing circuitry 1510, when executing the program instructions, can perform the functions and processes. The memory 1520 can further store other programs or data, such as operating systems, application programs, and the like. The memory 1520 can include non-transitory storage media, such as a read only memory (ROM), a random access memory (RAM), a flash memory, a solid state memory, a hard disk drive, an optical disk drive, and the like.

In an embodiment, the RF module 1530 receives a processed data signal from the processing circuitry 1510 and converts the data signal to beamforming wireless signals that are then transmitted via antenna arrays 1540, or vice versa. The RF module 1530 can include a digital to analog convertor (DAC), an analog to digital converter (ADC), a frequency up convertor, a frequency down converter, filters and amplifiers for reception and transmission operations. The RF module 1530 can include multi-antenna circuitry for beamforming operations. For example, the multi-antenna circuitry can include an uplink spatial filter circuit, and a downlink spatial filter circuit for shifting analog signal phases or scaling analog signal amplitudes. The antenna arrays 1540 can include one or more antenna arrays.

The apparatus 1500 can optionally include other components, such as input and output devices, additional or signal processing circuitry, and the like. Accordingly, the apparatus 1500 may be capable of performing other additional functions, such as executing application programs, and processing alternative communication protocols.

The processes and functions described herein can be implemented as a computer program which, when executed by one or more processors, can cause the one or more processors to perform the respective processes and functions. The computer program may be stored or distributed on a suitable medium, such as an optical storage medium or a solid-state medium supplied together with, or as part of, other hardware. The computer program may also be distributed in other forms, such as via the Internet or other wired or wireless telecommunication systems. For example, the computer program can be obtained and loaded into an apparatus, including obtaining the computer program through physical medium or distributed system, including, for example, from a server connected to the Internet.

The computer program may be accessible from a computer-readable medium providing program instructions for use by or in connection with a computer or any instruction execution system. The computer readable medium may include any apparatus that stores, communicates, propagates, or transports the computer program for use by or in connection with an instruction execution system, apparatus, or device. The computer-readable medium can be magnetic, optical, electronic, electromagnetic, infrared, or semiconductor system (or apparatus or device) or a propagation medium. The computer-readable medium may include a computer-readable non-transitory storage medium such as a semiconductor or solid state memory, magnetic tape, a removable computer diskette, a random access memory (RAM), a read-only memory (ROM), a magnetic disk and an optical disk, and the like. The computer-readable non-transitory storage medium can include all types of computer readable medium, including magnetic storage medium, optical storage medium, flash medium, and solid state storage medium.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A method, comprising:
receiving one or more physical uplink control channel (PUCCH) resource configurations from a base station (BS) at a user equipment (UE) in a wireless communication system, each PUCCH resource configuration being associated with a resource index, each PUCCH resource configuration indicating multiple candidate PUCCH resources distributed in different subbands configured to the UE;
receiving a PUCCH resource set including a list of the resource indices of ones of the one or more PUCCH resource configurations;

determining a first resource index from the resource indices included in the PUCCH resource set based on a PUCCH resource indication signaled from the BS;

selecting a first PUCCH resource from the multiple candidate PUCCH resources indicated by the PUCCH resource configuration associated with the first resource index; and transmitting an uplink control information (UCI) on the first PUCCH resource selected from the multiple candidate PUCCH resources indicated by the PUCCH resource configuration associated with the first resource index.

2. The method of claim 1, further comprising:

receiving a channel state information (CSI) reporting configuration indicating one or more bandwidth parts (BWPs) each associated with one of the resource indices of the one or more PUCCH resource configurations, the UE operating on a first BWP of the one or more BWPs;

determining a second resource index that is the resource index corresponding to the first BWP the UE operates on;

selecting a second PUCCH resource from the multiple candidate PUCCH resources indicated by the PUCCH resource configuration associated with the second resource index; and transmitting a CSI report on the second PUCCH resource.

3. The method of claim 1, wherein ones of the one or more PUCCH resource configurations each indicate a number of subbands each configured with one of the multiple candidate PUCCH resources indicated by the respective PUCCH resource configuration.

4. The method of claim 1, wherein ones of the one or more PUCCH resource configurations each indicate a starting resource unit in frequency domain for each of the multiple candidate PUCCH resources indicated by the respective PUCCH resource configuration.

5. The method of claim 4, wherein the multiple candidate PUCCH resources indicated by the respective PUCCH resource configuration have the same starting resource unit.

6. The method of claim 1, wherein ones of the one or more PUCCH resource configurations each indicate a resource format for each of multiple candidate PUCCH resources indicated by the respective PUCCH resource configuration.

7. The method of claim 6, wherein the multiple candidate PUCCH resources indicated by the respective PUCCH resource configuration have the same resource format.

8. An apparatus, comprising circuitry configured to:

receive one or more physical uplink control channel (PUCCH) resource configurations from a base station (BS) in a wireless communication system, each PUCCH resource configuration being associated with a resource index, each PUCCH resource configuration indicating multiple candidate PUCCH resources distributed in different subbands configured to the UE;

receive a PUCCH resource set including a list of the resource indices of ones of the one or more PUCCH resource configurations;

determine a first resource index from the resource indices included in the PUCCH resource set based on a PUCCH resource indication signaled from the BS;

select a first PUCCH resource from the multiple candidate PUCCH resources indicated by the PUCCH resource configuration associated with the first resource index; and transmit an uplink control information (UCI) on the first PUCCH resource selected from the multiple candidate PUCCH resources indicated by the PUCCH resource configuration associated with the first resource index.

9. The apparatus of claim 8, wherein the circuitry is further configured to:

receive a channel state information (CSI) reporting configuration indicating one or more bandwidth parts (BWPs) each associated one of the resource indices of the one or more PUCCH resource configurations, the UE operating on a first BWP of the one or more BWP;

determine a second resource index that is the resource index corresponding to the first BWP the LIE operates on;

select a second PUCCH resource from the multiple candidate PUCCH resources indicated by the PUCCH resource configuration associated with the second resource index; and transmit a CSI report on the second PUCCH resource.

10. The apparatus of claim 8, wherein ones of the one or more PUCCH resource configurations each indicate a number of subbands each configured with one of the multiple candidate PUCCH resources indicated by the respective PUCCH resource configuration.

11. The apparatus of claim 8, wherein ones of the one or more PUCCH resource configurations each indicate a starting resource unit in frequency domain for each of the multiple candidate PUCCH resources indicated by the respective PUCCH resource configuration.

12. The apparatus of claim 11, wherein the multiple candidate PUCCH resources indicated by the respective PUCCH resource configuration have the same starting resource unit.

13. The apparatus of claim 8, wherein ones of the one or more PUCCH resource configurations each indicate a resource format for each of multiple candidate PUCCH resources indicated by the respective PUCCH resource configuration.

14. The apparatus of claim 13, wherein the candidate PUCCH resources indicated by the respective PUCCH resource configuration have the same resource format.

15. A non-transitory computer-readable medium storing instructions that, when executed by a processor, cause the processor to perform a method, the method comprising:

receiving one or more physical uplink control channel (PUCCH) resource configurations from a base station (BS) at a user equipment (UE) in a wireless communication system, each PUCCH resource configuration being associated with a resource index, each PUCCH resource configuration indicating multiple candidate PUCCH resources distributed in different subbands configured to the UE;

receiving a PUCCH resource set including a list of the resource indices of ones of the one or more PUCCH resource configurations;

determining a first resource index from the resource indices included in the PUCCH resource set based on a PUCCH resource indication signaled from the BS;

selecting a first PUCCH resource from the multiple candidate PUCCH resources indicated by the PUCCH resource configuration associated with the first resource index; and transmitting an uplink control information (UCI) on the first PUCCH resource selected from the multiple candidate PUCCH resources indicated by the PUCCH resource configuration associated with the first resource index.

16. The non-transitory computer-readable medium of claim 15, wherein the method further comprises:

receiving a channel state information (CSI) reporting configuration indicating one or more bandwidth parts (BWPs) each associated with one of the resource indices of the one or more PUCCH resource configurations, the UE operating on a first BWP of the one or more BWPs;

determining a second resource index that is the resource index corresponding to the first BWP the UE operates on;

selecting a second PUCCH resource from the multiple candidate PUCCH resources indicated by the PUCCH resource configuration associated with the second resource index; and transmitting a CSI report on the second PUCCH resource.

17. The non-transitory computer-readable medium of claim 15, wherein ones of the one or more PUCCH resource configurations each indicate a number of subbands each configured with one of the multiple candidate PUCCH resources indicated by the respective PUCCH resource configuration.

18. The non-transitory computer-readable medium of claim 15, wherein ones of the one or more PUCCH resource configurations each indicate a starting resource unit in frequency domain for each of the multiple candidate PUCCH resources indicated by the respective PUCCH resource configuration.

19. The non-transitory computer-readable medium of claim 18, wherein the multiple candidate PUCCH resources indicated by the respective PUCCH resource configuration have the same starting resource unit.

20. The non-transitory computer-readable medium of claim 15, wherein ones of the one or more PUCCH resource configurations each indicate a resource format for each of multiple candidate PUCCH resources indicated by the respective PUCCH resource configuration.

* * * * *